Patented Mar. 8, 1949

2,464,176

UNITED STATES PATENT OFFICE 2,464,176

N-ARALKYL-ALKYLAMINE SALTS OF CHLOROPHENOLS

Gerald H. Coleman, Midland, Mich., assignor to The Dow Chemical Company, Midland, Mich., a corporation of Delaware No Drawing. Application October 21, 1946, Serial No. 704,799

4 Claims. (Cl. 260—567.5)

1

The invention relates to a new class of compounds which consists in the N-aralkyl-alkylamine salts of chlorophenols. The new compounds have the general formula:

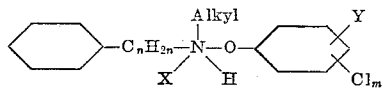

wherein X is alkyl or hydrogen, Y is alkyl, aryl or hydrogen, $m$ is an integer not greater than 5, and $n$ is an integer not greater than 2.

The compounds are crystalline solids or viscous liquids, somewhat soluble in organic solvents and practically insoluble in water. They are stable to light and air, not appreciably affected by carbon dioxide, and relatively non-corrosive to human skin. The compounds are particularly useful as toxicants in parasiticidal compositions, such as in insecticidal and fungicidal preparations.

The new compounds are prepared by reacting an N-aralkyl-alkylamine with a chlorophenol. Substantially equimolecular proportions of the chlorophenol and amine have been found to give the desired salt in good yield. Where an excess of one or the other reactant is employed, separation is readily accomplished by extraction of the crude salt product with benzene, alcohol, or other selective solvent for the chlorophenol and amine, or for the amine salt. The crude reaction product, consisting essentially of the amine salt, is adapted to be employed as a fungicidal toxicant without further purification.

A preferred method of operation comprises carrying out the reaction in the presence of an organic solvent, such as benzene, chlorobenzene, toluene, or alcohol. The operating temperatures are not critical, although a smaller amount of solvent is required when the reaction is carried out at somewhat elevated temperature, e. g. between about 40° and 120° C., and conveniently at the refluxing temperature of the reaction mixture.

To insure the formation of a relatively homogeneous product and to minimize occlusion, the reactants are preferably mixed portionwise with stirring over a short period of time. Following the completion of the reaction the mixture is filtered or otherwise manipulated to separate out the desired amine salt compound. Since the desired products are for the most part solids, such separation may comprise recrystallization or washing with solvent to remove unreacted residues of amine or chlorophenol. Should the product be liquid, the reaction mixture may be warmed to drive off the solvent of reaction and the residue dispersed in a preferential solvent to extract out unreacted chlorophenol or amine remaining therein.

The following examples set forth certain embodiments of the invention, but are not to be construed as limiting the same:

Example 1

14.32 grams (0.07 mol) of N-benzyl-diethylamine and 11.48 grams (0.07 mol) of a mixture of isomeric 2-phenyl-monochlorophenols were mixed together. Appreciable heat of reaction was evolved and the mixture was allowed to stand for a period of several hours. The crude product of reaction consisted of a tan colored oil having a specific gravity of 1.124 at 25°/25° C. This N-benzyl-diethylamine salt of 2-phenyl-monochlorophenol product was somewhat soluble in 95 per cent ethanol, carbon tetrachloride, and kerosene. A saturated water solution at 24° C. contained 0.019 per cent by weight of the salt and had a pH of 9.5.

Example 2

21.9 grams (0.1 mol) of 2.6-dichloro-4-tertiarybutylphenol, 21.7 grams (0.1 mol) of N-benzyl-di-n-butylamine, and 20 milliliters of 95 per cent ethanol were mixed together and warmed to boiling temperature. The mixture was then cooled to precipitate out the amine salt which was recovered by filtration. The residue from the filtration was washed and dried to obtain 15 grams of the N-benzyl-di-n-butylamine salt of 2.6-dichloro-4-tertiarybutylphenol as a white crystalline compound melting at 67°–69° C. This compound was soluble in 95 per cent ethanol, carbon tetrachloride, and kerosene. A saturated water solution at 24° C. contained 0.114 per cent by weight of the compound and had a pH of 7.4.

Example 3

16.3 grams (0.1 mol) of N-benzyl-n-butylamine and 21.9 grams (0.1 mol) of 2.6-dichloro-4-tertiarybutylphenol were reacted together in 40 milliliters of 95 per cent ethanol substantially as described in the foregoing example. The resulting product consisted of 35 grams of N-benzyl-n-butylamine salt of 2.6-dichloro-4-tertiarybutylphenol as a white crystalline compound melting at 86.6°–87.4° C. This compound was somewhat soluble in 95 per cent ethanol, carbon tetrachloride, and hot kerosene. A saturated water solution at 24° C. contained 0.019 per cent by weight of the compound and had a pH of 8.0.

Example 4

16.4 grams (0.1 mol) of N-benzyl-diethylamine and 19.75 grams (0.1 mol) of 2.4.6-trichlorophenol were mixed together for a period of several hours. Heat of reaction was evolved and the solid phenol went into solution. On cooling there was obtained an N-benzyl-diethylamine salt of 2.4.6-trichlorophenol product as a viscous brown transparent oil having a specific gravity of 1.265 at 25°/25° C. This product was somewhat soluble in 95 per cent ethanol and carbon tetrachloride, and slightly soluble in kerosene. A saturated water solution at 24° C. contained 0.053 per cent by weight of the compound and had a pH of 8.5.

Example 5

In a similar manner equimolecular proportions of benzyl diethylamine and 2.3.4.6-tetrachlorophenol were reacted together to obtain a salt product as a yellow green fluorescent oil. This material was somewhat soluble in 95 per cent ethanol and kerosene, and substantially insoluble in water.

Example 6

26.65 grams (0.1 mol) of pentachlorophenol was dissolved in 70 milliliters of 95 per cent ethanol. 21.9 grams (0.1 mol) of N-benzyl-di-n-butylamine was added portionwise with mixing to the phenol solution over a short period of time. Appreciable heat of reaction was developed. The mixture was allowed to cool, filtered, and the residue from the filtration washed with cold alcohol and dried. The resulting product consisted of 32 grams of the N-benzyl-di-n-butylamine salt of pentachlorophenol as a solid melting at 51.6°–53.2° C. This material was very soluble in carbon tetrachloride, somewhat soluble in 95 per cent ethanol, and slightly soluble in kerosene. A saturated water solution at 24° C. contained 0.013 per cent by weight of the compound and had a pH of 7.9.

Example 7

In a similar manner 0.1 molar quantities of the N-benzyl-n-butylamine and pentachlorophenol were reacted together in 40 milliliters of hot 95 per cent ethanol. The resulting product consisted of 36 grams of N-benzyl-n-butylamine salt of pentachlorophenol as light brown crystals melting at 133°–135° C. This compound was somewhat soluble in 95 per cent ethanol and carbon tetrachloride, and difficulty soluble in kerosene. A saturated water solution at 26° C. contained 0.014 per cent by weight of the compound and had a pH of 6.8.

Example 8

8 grams (0.03 mol) of N-(beta-phenylethyl)-dibutylamine and 9.13 grams (0.03 mol) of pentachlorophenol were dissolved in hot benzene with stirring. Upon cooling, the salt product failed to crystallize and the solvent was removed by distillation under vacuum. The residue consisted of 17 grams of a N-(beta-phenylethyl)-dibutylamine salt of pentachlorophenol product as a brown liquid soluble in carbon tetrachloride and 95 per cent ethanol, and difficulty soluble in kerosene. A saturated water solution of this product at 25° C. contained 0.017 per cent by weight of the amine salt.

Example 9

10.5 grams of N-(alpha-phenylethyl)-n-amylamine, and 14.5 grams of pentachlorophenol were dissolved in hot benzene. The reaction product was cooled to 0° C. for 24 hours and thereafter filtered. The residue from the filtration was washed with benzene and air dried to obtain 19.5 grams of the N-(alpha-phenylethyl)-n-amylamine salt of pentachlorophenol as a light crystalline product melting at 118°–120° C. This compound was somewhat soluble in 95 per cent ethanol, carbon tetrachloride, and kerosene. A saturated water solution at 25° C. contained 0.007 per cent by weight of the compound and had a pH of 5.8.

The N-aralykyl-alkylamine addition salts of chlorophenols, as described in the preceding examples, may be used as active toxicants in parasiticidal compositions. In such use, the compounds are preferably employed in combination with an inert carrier. While all of these compounds exert a definite insecticidal or fungicidal action, the salts of the poychlorophenols have been found particularly well adapted for use in fungicidal spray or dust compositions. These compounds are sufficiently insoluble in water and have such a low volatility that they provide insecticidal, fungicidal, and germicidal protection over a comparatively long period of time.

When employed in dust mixtures, the amine salts are preferably dispersed in or on solid finely divided inert carriers, such as diatomaceous earth, volcanic ash, bentonite, talc, wood flour, and the like. Compositions comprising from about 0.5 to 10 per cent by weight of such salt are particularly useful.

Mixtures of the amine salts with inert carriers may also be dispersed in water and employed as sprays. In preparing dust mixtures for use in such aqueous compositions, the amine salts may be employed in amounts up to 80 per cent or 90 per cent by weight of the finely divided solid concentrate, although from 15 per cent to 25 per cent by weight is preferred. Similarly, aqueous solutions or dispersions of the amines or solutions or dispersions thereof in such solvents as alcohol, carbon tetrachloride, and petroleum distillate are useful for insecticidal, fungicidal, and germicidal control.

Various wetting, sticking, and dispersing agents, such as glyceryl oleate, alkali metal caseinnates, aluminum naphethenate, alkali metal salts of sulfonated aromatic hydrocarbons or phenols, sodium lauryl sulfate, partially neutralized sulfuric acid derivatives of fatty acids and oils, blood albumen, soap and the like may be employed in combination with the new amine salts. The relatively insoluble nature of the salts adapts them to be employed in combination with other insecticidal and fungicidal agents such as lead arsenate, petroleum oil, nicotine, sulfur, copper sprays, pyrethrins, rotenone, cryolite, and the like.

The following examples illustrate the use of the amine salts in parasiticidal compositions:

Example 10

20 parts by weight of the N-benzyl-diethylamine salt of 2.3.4.6-tetrachlorophenol and 80 parts by weight of diatomaceous earth were ground together to form a concentrate in which the amine salt was dispersed in and on the particles of the carrier. Sufficient of this product was dispersed in water to give a concentration of 2 pounds of the amine salt per 100 gallons. This dispersion was employed as a spray material for the control of poplar aphis and gave 100 per cent kill within 2 days of application.

Example 11

16.6 parts by weight of N-benzyl-di-n-butylamine salt of pentachlorophenol, 66.7 parts of diatomaceous earth, and 16.6 parts of sodium lauryl sulfate were ground together to obtain an intimate mixture in which the particles of the amine salt were uniformly distributed through the carrier. Sufficient of this composition was dispersed in water to give a concentration of 0.25 pound of the amine salt per 100 gallons of water. This aqueous dispersion was employed as a spray material for the control of red spider. In 4 applications this composition gave an average kill of 93.6 per cent of adult and young spiders.

Example 12

A number of the N-aralkyl-alkylamine salts of chlorophenols were employed as fungicides in 1 per cent by weight mixtures with finely divided pyrophyllite. In these operations, the amine salt and pyrophyllite were ground and mixed together to form dusting compositions. The products so obtained were applied to the surface of a luxuriant growth of a wood destroying organism of the type of *Fomes annosus* and identified as Forest Products Laboratory culture No. 517. The dusting was carried out so that a deposit of 1.4 milligrams of the dust was obtained per square centimeter of mold surface. In this determination, the N-benzyl diethylamine salt of 2.3.4.6-tetrachlorophenol and the N-benzyl-n-butylamine salt of pentachlorophenol gave controls of 100 per cent. The N-benzyl-di-n-butylamine salt of pentachlorophenol and the N-betaphenylethyl-di-n-butylamine salt of pentachlorophenol gave 95 per cent controls.

This application is a continuation-in-part of my application Serial No. 419,857, filed November 21, 1941, which is now abandoned.

I claim:

1. A compound having the formula:

$$\text{C}_6\text{H}_5-\text{C}_n\text{H}_{2n}-\underset{\underset{\text{H}}{|}}{\overset{\overset{\text{Alkyl}}{|}}{\text{N}}}-\text{O}-\text{C}_6\text{H}_{(5-m)}\text{Cl}_m$$

wherein X is selected from the group consisting of hydrogen and alkyl, $n$ is an integer not greater than 2, and $m$ is an integer not greater than 5.

2. N-benzyl-di-n-butylamine salt of pentachlorophenol.

3. N-benzyl-diethylamine salt of 2.3.4.6-tetrachlorophenol.

4. N-benzyl-n-butylamine salt of pentachlorophenol.

GERALD H. COLEMAN.

No references cited.